United States Patent Office 3,487,125
Patented Dec. 30, 1969

3,487,125
RESINOUS COMPOSITIONS OF EPOXY RESIN, HIGH MELTING ACID OR ANHYDRIDE OF AT LEAST THREE CARBOXYLIC GROUPS AND AROMATIC HYDROCARBON-ALDEHYDE RESIN
Joseph A. Verdol, Dolton, and Donald J. Carrow, Ivanhoe, Ill., assignors to Sinclair Research, Inc., New York, N.Y., a corporation of Delaware
No Drawing. Filed May 10, 1967, Ser. No. 637,355
Int. Cl. C08g 45/04
U.S. Cl. 260—837                                                    12 Claims

ABSTRACT OF THE DISCLOSURE

A resinous composition of matter comprising the reaction product of an aromatic hydrocarbon-aldehyde resin; a polyether ethoxyline resin containing epoxy groups of an epoxylated material selected from the class consisting of polyhydric alcohols and phenols containing at least two phenolic hydroxy groups; and a polycarboxylic acid or anhydride thereof having 3 to 100 carboxylic acid groups.

---

This invention relates to the production of new and improved resinous compositions by the inclusion of aromatic hydrocarbon-aldehyde resins in systems comprising polyether ethoxyline resins containing epoxy groups, and polycarboxylic acids or their anhydrides. These new and improved resinous compositions are eminently suitable for use as molding, casting, coating, or laminating compositions.

In the art of preparing molding, laminating and coating compositions from epoxy resins, the use of certain high melting polycarboxylic acids or their anhydrides, such as trimellitic anhydride, pyromellitic anhydride and copolymers of styrene and maleic anhydride, as curing agents will produce cured compositions. The problem which results, however, is that polycarboxylic acids or their anhydrides have high melting points and are not completely compatible with epoxy resins at ambient temperatures. Because of these high melting points, it is usually necessary to heat the epoxy resin and the polycarboxylic acid or its anhydride to a temperature near the melting point of the polycarboxylic acid or anhydride to obtain the necessary compatibility for use of the mixture in the preparation of castings, molds, coatings, laminates and the like. Under these elevated temperature conditions, the chemical reaction between the epoxy resin and the anhydride proceeds very fast. In most cases, the curing reaction occurs more rapidly than desired and suitable castings, moldings, coatings, or laminates cannot be prepared in the short time interval remaining after the high melting acids or anhydrides and epoxy resins have been homogeneously mixed. As a result, the cured compositions are usually brittle and have poor impact strength.

In the present invention, it has been discovered that the inclusion of a hydrocarbon-aldehyde resin, such as xylene-formaldehyde resin as a component of a casting, molding, coating, or laminating composition comprising an epoxy resin and a polycarboxylic acid or anhydride, such as trimellitic anhydride, pyromellitic anhydride or a copolymer of styrene and maleic anhydride, provides improved compatibility between the polycarboxylic acid or anhydride and the epoxy resin while at the same time producing an overall improvement in the physical properties of the cured composition. In this invention, the hydrocarbon-aldehyde resin enables an otherwise incompatible system to be prepared at temperatures sufficiently low so as to allow a most satisfactory pot life prior to effecting the final cure of the composition.

In accordance with the invention, the advantages provided by the use of a hydrocarbon-aldehyde resin in epoxy resin and polycarboxylic acid or anhydride compositions are manifold. The cost of the final composition is reduced since a hydrocarbon-aldehyde resin such as xylene-formaldehyde resin can be produced more economically than either the epoxy resin or the polycarboxylic acid or anhydride. The enhanced compatibility and long pot life which is attainable permits casting, molding, coating, and laminating compositions to be pre-mixed and stored for extended time intervals prior to use. The incorporation of the hydrocarbon-aldehyde resin as part of the epoxy resin and carboxylic acid or anhydride composition improves the physical and electrical properties of the molding, casting, coating, or laminate. For example, one may incorporate the desired degree of flexibility in the final product without adversely affecting the impact resistance or heat of distortion of the formulation Also, many epoxy resin-polycarboxylic acid or anhydride systems which are ordinarily too brittle for practical application can be made to possess outstanding physical properties through the incorporation of a hydrocarbon-aldehyde resin such as a xylene-formaldehyde resin.

According to the invention, the new and improved resinous composition of the present invention comprise the reaction products of (a) an aromatic hydrocarbon-aldehyde resin, the aromatic-hydrocarbon resin often having a molar ratio of aromatic-hydrocarbon to aldehyde of about 25:1 to 1:100, preferably 5:1 to 1:5, and frequently having a molecular weight of about 200 to 5000, preferably 250 to 1500; (b) a polyether ethoxyline resin containing epoxy groups and comprising a polyether derivative of a polyhydric organic compound selected from the class consisting of polyhydric alcohols and phenols containing at least two phenolic hydroxy groups; and (c) a polycarboxylic acid or anhydride having 3 to 100 carboxylic acid groups, preferably 3 to 20. The aromatic hydrocarbon-aldehyde resin can comprise about 5 to 75 percent, by weight, of the composition, the polyether ethoxyline resin can comprise about 5 to 90 percent, by weight, of the composition, and the polycarboxylic acid or anhydride can comprise about 1 to 75 percent, by weight, of the composition.

Aromatic hydrocarbons which may be reacted with aldehydes to produce the low cost aromatic hydrocarbon-aldehyde resins found eminently suitable in preparing the compositions of this invention often contain 6 to 16 or 20 carbon atoms and include ortho-, meta-, and para-xylene individually, commercial xylene which is a mixture of the three xylenes plus a small perecntage of ethylbenzene, naphthylene, alkyl-substituted naphthylenes, anthracene, alkyl-substituted anthacene, mesitylene, etc.

Aldehydes which may be used to advantage in preparing the instant aromatic hydrocarbon-aldehyde resins often contain about 1 to 20, preferably 1 to 5, carbon atoms and include aldehydes which readily react with phenols to give phenol-aldehyde type resins. Suitable aldehydes include aliphatic aldehydes, for example, formaldehyde, acetaldehyde, propionaldehyde, butyraldehyde, etc.; aromatic aldehydes, for example, benzaldehyde, etc.; and heterocyclic oxygen containing aldehydes such as furfural, etc.

The aromatic hydrocarbon-aldehyde resin can be prepared by condensing the aromatic hydrocarbon with the aldehyde, for instance, pure m-xylene or commercial xylene with formaldehyde (either aqueous, anhydrous, or alcoholic), at a temperature of about 75–150° C., preferably, 100–115° C., and a pressure of about 1 atm. to 100 atm. using acidic catalysts which are capable of effecting such a condensation reaction. Trifluoroacetic acid or phosphoric acid are preferred catalysts. When the aromatic hydrocarbon-aldehyde resin used in preparing the composition is xylene-formaldehyde, resin, the molar ratio of xylene to formaldehyde can be 25:1 to 1:100, preferably 5:1 to 1:5. The aromatic hydrocarbon aldehyde resin can be isolated by separating the acid, washing with water, followed by neutralization and stripping in vacuo.

The reaction product is believed to contain hydroxy methyl groups, methylene ether groups and methylene groups which can be demonstrated in the following structure:

Ethoxyline resins which can be used in the invention include those described more fully in, for instance, Castan U.S. Patent 3,324,483, Castan U.S. Patent 2,444,333, British Patent 518,057 and British Patent 579,698. Essentially these ethoxyline resins are based on the resinous product of reaction between the epihalogenohydrin, for instance epichlorohydrin and an aliphatic polyhydric alcohol, for example, glycerine or a phenol having at least two phenolic hydroxy groups, for example, bis-(4-hydroxyphenyl) dimethylmethane. Further examples of ethoxyline resins which may be employed in the practice of the present invention are disclosed in U.S. Patents 2,494,295; 2,500,600 and 2,511,913. By reference, the aforementioned patents are intended to be part of the present description of the ethoxyline resins used and, for brevity, the ethoxyline resins will not be described other than that they contain more than one epoxide group, e.g., from one to two or more epoxide groups per molecule and may be prepared by effecting reaction between a phenol or polyhydric alcohol, for example, phenol, hydroquinone, resorcinol, glycerine, and condensation products of phenols with ketones, for instance, bis-(4-hydroxyphenol) dimethylmethane (bisphenol A), with epichlorohydrin or other epihalogenohydrins. For example, the re-

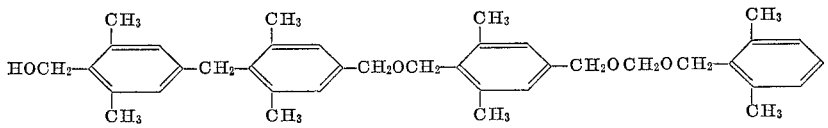

All of the above types of oxygen functional groups, as well as others may be present in the xylene-formaldehyde resins. No attempt has been made to present the various position isomers which may occur. Needless to say, they are numerous and varied. When preparing xylene-formaldehyde resins, the amount of oxygen which is present in the resin and the concentration of hydroxyl groups which are incorporated within the resin can be controlled to various degrees by adjusting acid concentration, temperature and the ratio of xylene to formaldehyde employed in the reaction. Insofar as the present invention is concerned, all xylene-formaldehyde resins appear to impart beneficial properties to the final epoxy formulation in which they are incorporated. However, those resins which contain some oxygen and hydroxyl groups are preferred over those which do not contain functional groups.

action of epichlorohydrin with bis-(4-hydroxyphenyl) dimethylmethane (bisphenol A) may be formulated as follows:

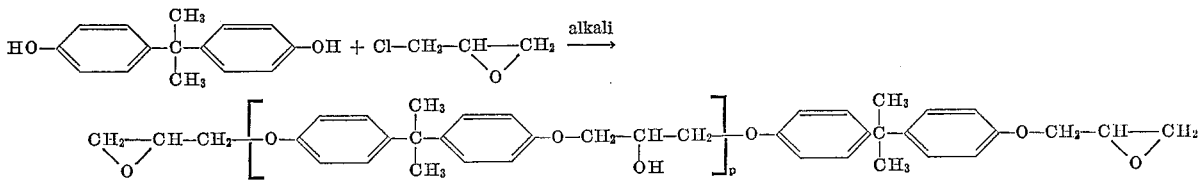

where $p$ has an average value varying from 0 to about 10. Many of these ethoxyline resins are sold under the name of Epon resins. Data on several of the Epon resins found eminently suitable for the practice of the invention are given in the table below:

TABLE I

| Resin type, Shell Chemical Co. Epon ® | Melting point, ° C. (Durrans) | Color, 25° C. (Gardner), (max.) | Epoxide equivalent * | Average molecular weight | Viscosity at 25° C., centipoises or Gardner-Holdt |
|---|---|---|---|---|---|
| 820 | Liquid | 8 | 175–210 | 350–400 | 4,000–10,000. |
| 828 | Liquid | 12 | 175–210 | 350–400 | 5,000–15,000. |
| 834 | Liquid | 10 | 225–290 | 450 | $A_2$–$A_1$. |
| 864 | 40–50 | 8 | 300–375 | 700 | $A_1$–B. |
| 1,001 | 64–76 | 8 | 450–535 | 900–1000 | C–G. |
| 1,004 | 95–105 | 6 | 870–1025 | 1400 | Q–U. |
| 1,007 | 125–132 | 8 | 1650–2050 | 2900 | Y–$Z_1$. |
| 1,009 | 145–155 | 11 | 2400–4000 | 3800 | $Z_2$–$Z_5$. |

* The epoxide equivalent is the weight of resin in grams which contains 1 gram chemical equivalent of epoxy If the resin chains are assumed to be linear with no side branching and it is further assumed that an epoxy group terminates each end, then the epoxide equivalent (weight) is one half of the average molecular weight of the resin. Epoxide equivalents are determined by reacting a known quantity of resin with a known quantity of hydrochloric acid and back-titrating the remaining acid to determine its consumption.

Polycarboxylic acids or anhydrides which may be used in the invention include trimellitic anhydride, pyromellitic anhydride, and copolymers of styrene and maleic anhydride as well as other polycarboxylic acids or their anhydrides having a melting point of at least about 50° C., preferably at least about 150° C. Preparation of the styrene-maleic anhydride copolymer can be by known methods. A preferred method is by solution polymerization where the monomers are polymerized in a suitable solvent employing as a polymerization catalyst a free-radical catalyst, such as a peroxide, preferably benzoyl peroxide; dicumyl peroxide or an alkyl peroxy dicarbonate, at a temperature of about 75 to 300° C. or more. Suitable solvents include the aromatic hydrocarbon solvents, such as cumene, p-cymene, xylene, toluene, etc. Other suitable solvents are the ketones, such as methyl ethyl ketone. The preferred manner of carrying out the polymerization is by what is known as incremental feed addition. By this method the monomers and catalyst are first dissolved in a portion of the solvent in which the polymerization is to be conducted and the resulting solution is fed in increments into a reactor containing solvent heated to reaction temperature, usually the reflux temperature of the mixture.

When an aromatic solvent is employed as the solvent for the polymerization, the formation of the copolymer produces a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation. Styrene and maleic anhydride are copolymerized in a molar ratio of styrene to maleic anhydride of about 1 to 10:1, preferably 1 to 3:1. The resulting copolymer can have a molecular weight of about 400 to 10,000 and a melting point of 50° C. to 350° C. The kinematic viscosity at 30° C. of a 10 percent by weight solution of the copolymer in acetone may range from 0.4 to 500 centistokes, preferably 0.5 to 10.

The compositions of the invention are generally prepared by hot blending, temperatures of the order of from 50° C. to 200° C. are preferred. Curing catalysts such as tertiary amines or amine salts, quaternary amine bases or salts may be used, if desired, to shorten the curing time.

Coating and laminate applications normally employ organic solvent solutions of the compositions disclosed. The solvent or solvent blend employed is chosen to provide the desired volatility, rheology, sprayability or other properties. Solvents which are suitable include aromatic hydrocarbons such as toluene and xylene, ketones such as methyl ethyl ketone, methyl isobutyl ketone, etc.

The compositions of the present invention may include other additives such as pigments, fillers, plasticizers and the like. Illustrative examples of pigments which are useful in the practice of this invention are titanium dioxide, cadmium red, carbon black, light chrome green, iron blue, ultramarine blue, furnace black, and others. Conventional solid fillers suitably added to the compositions prepared according to this invention include powdered metals, such as aluminum powder, and other finely divided materials such as asbestos, silicas, talcs, various clays, and the like. Plasticizers suitably added to the compositions prepared according to this invention include phthalate esters, e.g. dibutyl phthalate and dioctyl phthalate; trimellitate esters, e.g. tributyl mellitate and trioctyl mellitate. Other suitable plasticizers are naphthenic oils, paraffinic oils, chlorinated paraffins, chlorinated biphenyls, chlorinated aromatics, polyesters, and polyethers.

In order that those skilled in the art may better understand how the present invention is practiced, the following examples are given by way of illustration. All are parts by weight.

Example I

A mixture of 8 parts of trimellitic anhydride and 25 parts of Epon 820 (epoxide equivalent 190) was heated to 125–150° C. in an attempt to form a viscous homogeneous mixture. It was very difficult to prepare a casting in this manner since, in the absence of a xylene-formaldehyde resin, the trimellitic anhydride and epoxy resin reacted immediately during the high temperature mixing step and the materials were already partially cured before they could be placed into a mold.

Example II

A xylene-formaldehyde resin was prepared by condensing equimolar amounts of trioxane and m-xylene with the use of 20 percent by weight of trifluoroacetic acid catalyst at 100° C., under reflux. The product was isolated by removing the acid and stripping off the unreacted xylene. Analysis of the resin was as follows: molecular weight—265, oxygen content—0.2 percent, hydroxyl value—0.4. A mixture of 8 parts of trimellitic anhydride, 25 parts of Epon 820 and 10 parts of the xylene-formaldehyde resin was heated to 125–150° C. to form a viscous homogeneous mixture. The liquid was placed in a mold for 12 hours at 150° C. An extremely hard, clear, and tough casting was obtained which had excellent impact resistance. When the composition was placed in a solvent such as xylene or methyl ethyl ketone, sprayed or roll coated on metal and wooden substrates, and baked for 5—30 minutes at 150–200° C., clear, flexible, and extremely tough coatings of varying thickness were obtained.

Example III

The xylene-formaldehyde resin was prepared in the same manner as described in Example II. In this example, 8.6 parts of trimellitic anhydride and 15 parts of the xylene-formaldehyde resin were pre-mixed and heated to 125–150° C. to form a viscous homogeneous mixture. To this mixture was added 30 parts of Epon 820 and the resulting viscous mixture was placed into a mold and cured for 1 hour at 150° C. A hard, clear and tough casting was obtained which had extremely outstanding impact resistance as compared to a comparable casting prepared from trimellitic anhydride and Epon 820 in the absence of a xylene-formaldehyde resin. When the composition was placed in a solvent such as xylene or methyl ethyl ketone, sprayed or roll coated on metal and wooden substrates, and baked for 5–30 minutes at 150–200° C., clear, flexible, and extremely tough coatings of varying thickness were obtained.

Example IV

A xylene-formaldehyde resin was prepared by reacting equimolar amounts of m-xylene and formaldehyde with about 30 percent by weight of phosphoric acid catalyst at 100–115° C. for about 18 hours. The product was isolated by separating the acid and washing with water, followed by neutralizing and stripping in vacuo. The final product showed the following analysis: molecular weight—339, hydroxyl value—89, oxygen content—5.4 percent. In this example, 8 parts of trimellitic anhydride and 10 parts of the xylene-formaldehyde resin were pre-mixed and heated to 125–150° C. to form a viscous homogeneous mixture. To this mixture was added 25 parts of Epon 820 and the resulting viscous mixture was placed into a mold and cured for 2 hours at 150° C. A hard, clear and tough high-impact casting was obtained. When the composition was placed in a solvent such as xylene or methyl ethyl ketone, sprayed or roll coated on metal and wooden substrates, and baked for 5–30 minutes at 150–200° C., clear flexible, and extremely tough coatings of varying thickness were obtained.

Example V

A xylene-formaldehyde resin was prepared by reacting 1 mole of m-xylene with 2 moles of paraformaldehyde with about 30 percent by weight of phosphoric acid catalyst at 100–115° C. for about 18 hours. The product was isolated by separating the acid and washing with water, followed by neutralizing and stripping in vacuo. The final product showed the following analysis: molecular weight—477, hydroxyl value—57, oxygen content—9.9 percent. In this example, 8 parts of trimellitic anhydride and 10 parts of the xylene-formaldehyde resin were pre-mixed and heated to 125–150° C. to form a viscous homogeneous mixture. To this mixture was added 25 parts of Epon 820 and the resulting viscous mixture was placed into a mold and cured for 2 hours at 150° C. A hard, clear and tough high-impact casting was obtained. When the composition was placed in a solvent such as xylene or methyl ethyl ketone, sprayed or roll coated on metal and wooden substrates, and baked for 5–30 minutes at 150–200° C., clear, flexible, and extremely tough coatings of varying thickness were obtained.

Example VI

The xylene-formaldehyde resin was prepared in the same manner as described in Example V. In this example, 10 parts of pyromellitic anhydride and 10 parts of xylene-formaldehyde resin were pre-mixed and heated to 125–150° C. to form a viscous homogeneous mixture. To this mixture was added 28 parts of Epon 820 and the resulting viscous mixture was placed into a mold and cured for 2 hours at 150° C. A hard, clear, and tough high-impact casting was obtained. When the composition was placed in a solvent such as xylene or methyl ethyl ketone, sprayed or roll coated on metal and wooden substrates, and baked for 5–30 minutes at 150–200° C., clear, flexible, and extremely tough coatings of varying thickness were obtained.

Example VII

The addition of xylene-formaldehyde resins to systems comprising copolymers of styrene and maleic anhydride and epoxy resins produced compositions with greatly improved impact resistance, tensile strength and flexibility.

Table II below summarizes the results of a series of experiments wherein the copolymer of styrene and maleic anhydride employed was one having a molar ratio of styrene to maleic anhydride of about 1:1 and a molecular weight of about 700. The xylene-formaldehyde resin was prepared in the same manner as described in Example V.

resulting mixture was placed in a mold and cured for 24 hours at 100° C. A hard, clear, and tough casting was obtained which possessed greatly improved physical properties over a casting prepared which did not contain xylene-formaldehyde resin.

It is claimed:
1. A resinous composition comprising the reaction product of:
 (a) an aromatic hydrocarbon-aldehyde resin;
 (b) a high melting polycarboxylic acid having 3 to 100 carboxylic acid groups or anhydride thereof, having a melting point of at least about 50° C.; and
 (c) a polyether ethoxyline resin containing epoxy groups of an epoxylated material selected from the class consisting of polyhydric alcohols and phenols containing at least two phenolic hydroxy groups;
the aromatic hydrocarbon-aldehyde resin comprising about 5 to 75 percent by weight of the composition, the high melting polycarboxylic acid or anhydride thereof comprising about 1 to 75 percent by weight of the composition, and the polyether ethoxyline resin comprising about 5 to 90 percent by weight of the composition.

2. The resinous composition of claim 1 wherein said aromatic hydrocarbon-aldehyde resin is xylene-formaldehyde resin.

3. The resinous composition of claim 1 wherein said polyether ethoxyline resin is the reaction product of bis-phenol A and epihalogenohydrin.

4. The resinous composition of claim 1 wherein said high melting polycarboxylic acid or anhydride thereof is trimellitric acid or its anhydride.

5. The resinous composition of claim 1 wherein said high melting polycarboxylic acid or anhydride thereof is pyromellitic acid or its anhydride.

TABLE II.—EPOXY CASTINGS CONTAINING XYLENE-FORMALDEHYDE RESINS AND COPOLYMER OF STYRENE AND MALEIC ANHYDRIDE
[Cured at 24 hours and 150° C.]

|  | Control | #1 | #2 | #3 | Result |
|---|---|---|---|---|---|
| Series A: |  |  |  |  |  |
| Epon 820 | 20 | 20 | 20 | 20 | All impartially cured impact properties. |
| Copolymer of styrene and maleic anhydride.* | 5 | 5 | 5 | 5 |  |
| Xylene-formaldehyde resin | 0 | 2.5 | 5 | 7.5 |  |
| Series B: |  |  |  |  |  |
| Epon 820 | 20 | 20 | 20 | 20 | All cured and had good impact properties. |
| Copolymer of styrene and maleic anhydride.* | 10 | 10 | 10 | 10 |  |
| Xylene-formaldehyde resin |  | 2.5 | 5 | 7.5 |  |
| Series C: |  |  |  |  |  |
| Epon 820 | 20 | 20 | 20 | 20 | Do. |
| Copolymer of stryene and maleic anhydride.* | 15 | 15 | 15 | 15 |  |
| Xylene-formaldehyde resin |  | 2.5 | 5 | 7.5 |  |
| Series D: |  |  |  |  |  |
| Epon 820 | 20 | 20 | 20 | 20 | All cured and had only fair impact properties. |
| Copolymer of sytrene and maleic anhydride.* | 20 | 20 | 20 | 20 |  |
| Xylene-formaldehyde resin | 0 | 2.5 | 5 | 7.5 |  |

* A copolymer of styrene and maleic anhydride having a molar ratio of styrene to maleic anhydride of about 1:1 and a molecular weight of about 700.

In Table II, excellent compatibility of the systems was obtained when xylene-formaldehyde was included in the compositions. When the copolymer of styrene and maleic anhydride and Epon 820 alone were used, it was necessary to maintain the mixtures at elevated temperatures to keep them compatible. Impact tests showed that Series C samples were far superior to the other samples included in Table II. In Series C, the impact properties improved as the concentration of xylene-formaldehyde resin increased.

Example VIII

The xylene-formaldehyde resin was prepared in the same manner as described in Example V. Fifty parts of xylene-formaldehyde resin and 50 parts of a copolymer of styrene and maleic anhydride having a molar ratio of styrene to maleic anhydride of about 1:1 and a molecular weight of about 1600 were pre-mixed at 200° C. A solid reaction product was obtained which was ground to a fine powder and mixed with 25 parts of Epon 820. The 6. The resinous composition of claim 1 wherein said high melting polycarboxylic acid or anhydride thereof is styrene-maleic anhydride copolymer having a molecular weight of about 400 to 10,000, a molar ratio of styrene to maleic anhydride of about 10:1 to 1:1, and a melting point of about 50° C. to 350° C.

7. The resinous composition of claim 1 comprising the reaction product of said polyether ethoxyline resin and a homogeneous mixture of said aromatic hydrocarbon-aldehyde resin and said high melting polycarboxylic acid or anhydride thereof.

8. A resinous composition comprising the reaction product of:
 (a) xylene-formaldehyde resin;
 (b) a high melting polycarboxylic acid or anhydride thereof selected from the group consisting of (i) trimellitic acid and its anhydride, (ii) pyromellitic acid and its anhydride and (iii) styrene-maleic anhydride copolymers having a molecular weight of about 400 to 10,000, a molar ratio of styrene to maleic anhydride of about 3:1 to 1:1, and a melting point of about 50° C. to 350° C., and (c) a polyether ethoxyline resin containing epoxy groups of an epoxylated material selected from the class consisting of polyhydric alcohols and phenols containing at least two phenolic hydroxy groups;

the xylene-formaldehyde resin comprising about 5 to 75 percent by weight of the composition, the high melting polycarboxylic acid or anhydride thereof comprising about 1 to 75 percent by weight of the composition, and the polyether ethoxyline resin comprising about 5 to 90 percent by weight of the composition.

9. The resinous composition of claim 8 wherein said polyether ethoxyline resin is the reaction product of bisphenol A and an epihalogenohydrin.

10. The resinous composition of claim 8 comprising the reaction product of said polyether ethoxyline resin and a homogeneous mixture of xylene-formaldehyde resin and trimellitic acid or its anhydride.

11. The resinous composition of claim 8 comprising the reaction product of said polyether ethoxyline resin and a homogeneous mixture of xylene-formaldehyde resin and pyromellitic acid or its anhydride.

12. The resinous composition of matter of claim 8 comprising the reaction product of said polyether ethoxyline resin and a homogeneous mixture of xylene-formaldehyde resin and said styrene-meleic anhydride copolymer.

References Cited

UNITED STATES PATENTS

| 2,890,192 | 6/1959 | Spencer | 260—830 |
| 3,207,717 | 9/1965 | Maier | 260—28 |
| 3,301,918 | 1/1967 | Dereich | 260—829 |

FOREIGN PATENTS

| 393,574 | 4/1964 | Japan. |

MURRAY TILLMAN, Primary Examiner

PAUL LIEBERMAN, Assistant Examiner

U.S. Cl. X.R.

117—132, 148; 260—2,18, 22, 23,31.8, 32.8, 33.6, 33.8, 37, 41, 47, 51, 78.4, 78.5, 830, 836